Dec. 17, 1957 M. KLAAR 2,816,303
MIRROR MAKING APPARATUS
Filed Oct. 26, 1951 4 Sheets-Sheet 1

INVENTOR.
MAX KLAAR
BY
ATTORNEY

Dec. 17, 1957 M. KLAAR 2,816,303
MIRROR MAKING APPARATUS
Filed Oct. 26, 1951 4 Sheets-Sheet 2

INVENTOR.
MAX KLAAR
BY
ATTORNEY

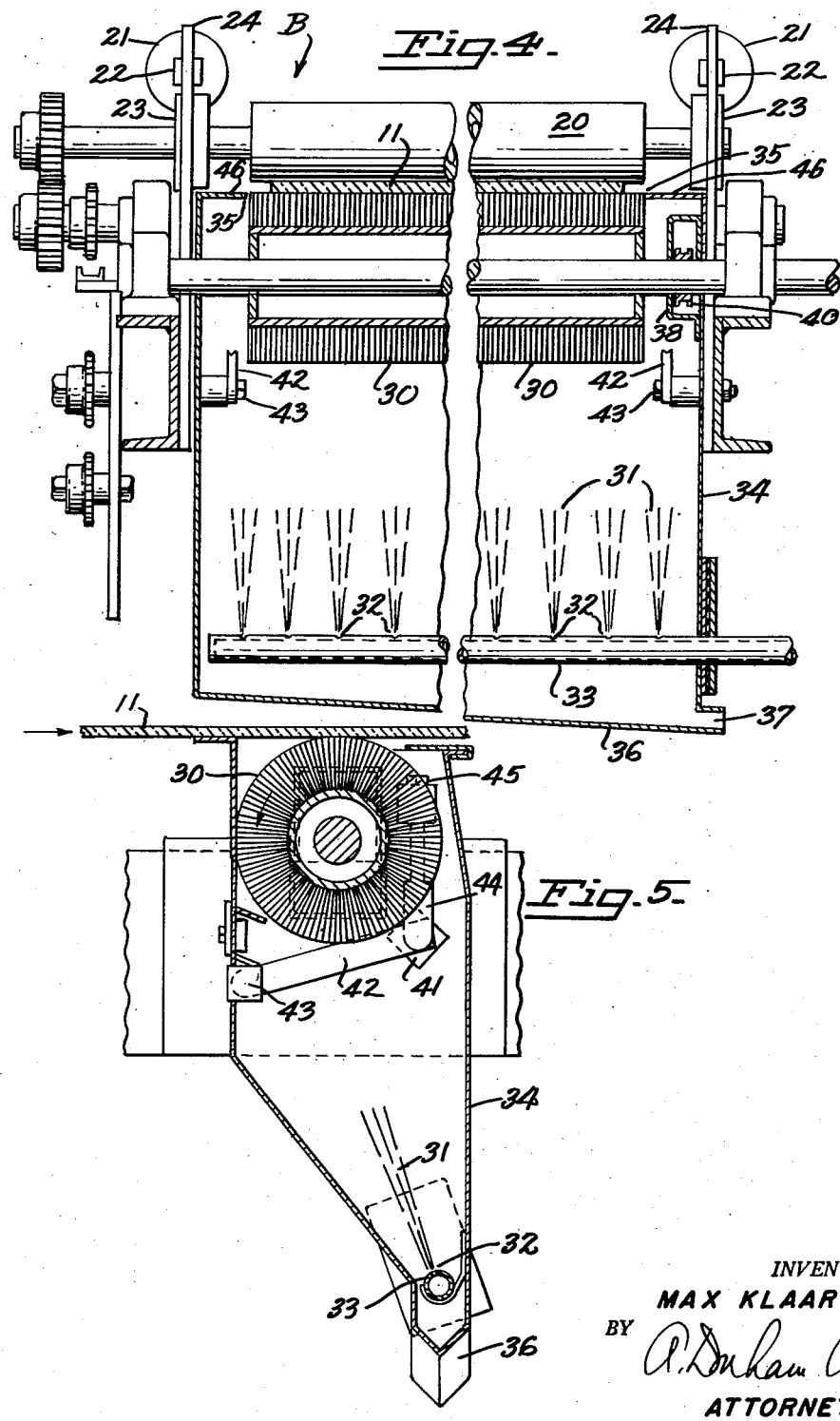

Dec. 17, 1957  M. KLAAR  2,816,303
MIRROR MAKING APPARATUS
Filed Oct. 26, 1951  4 Sheets-Sheet 4
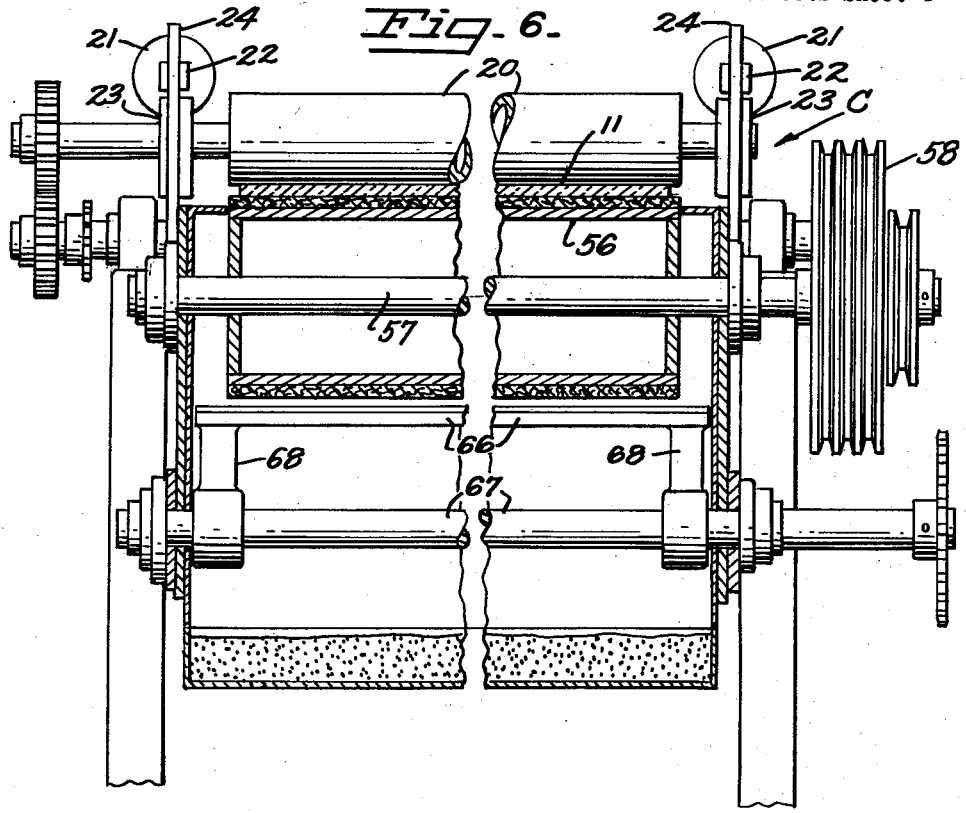
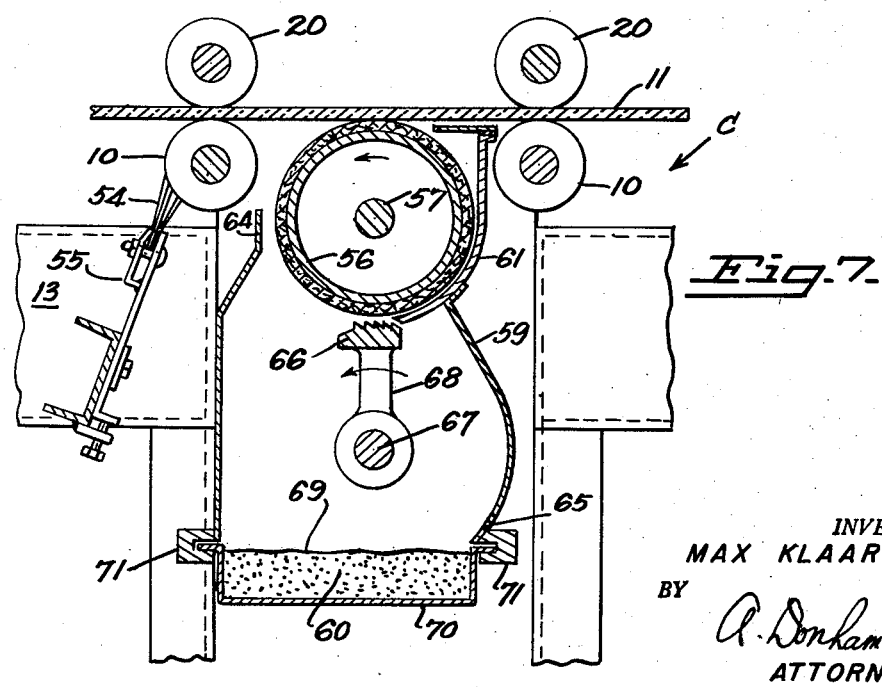
INVENTOR.
MAX KLAAR
BY
A. Donham Owen
ATTORNEY United States Patent Office 2,816,303
Patented Dec. 17, 1957

2,816,303

MIRROR MAKING APPARATUS

Max Klaar, San Mateo, Calif., assignor to W. P. Fuller & Co., San Francisco, Calif., a corporation of California Application October 26, 1951, Serial No. 253,340

17 Claims. (Cl. 15—4)

This invention relates to improvements in automatic mirror making machines and has particular relation to a device for cleaning off unwanted silver and paint and other foreign matter from the unsilvered side of the glass when the silvering operation has been completed.

This cleaning mechanism has solved one of the big problems at the unloading end of the machine and has made it truly an automatic mirror making machine. Before its invention cleaning, being done by hand, involved a great deal of handling and labor. The handling of large glass sheets was hazardous due to the possibility of breakage. Large amounts of the pumice was stirred up into the air by the hand cleaning process impairing the health of the workers. Also the glass was still hot at this point which made hand cleaning uncomfortable. Also a large number of adjacent tables had to be provided on which these workers would rest the mirrors while cleaning up the unsilvered face. All of this is done away with by the present invention so that now the mirrors come to the end of the machine cleaned, polished, and ready for shipment.

Another problem which was solved by this invention was the control of the paint solvent so that it would not get over onto the silvered back side of the mirror and ruin the silver coating. By this invention positive control of the solvents is obtained.

The object of the present invention is therefore to provide automatic means for removing any paint that has accidentally deposited itself on the unsilvered side, then removing any silver or other foreign matter thereon, and then drying and polishing the unsilvered side.

Other objects of the invention will become apparent from the following description of a preferred embodiment of the mechanism.

In the drawings:

Fig. 4 is a cross-section view in elevation taken through the middle of the silver removal unit;

Fig. 5 is a cross-section view in elevation taken along the fore and aft center line of the silver removal unit;

Fig. 6 is a cross-section view in elevation taken through the middle of the polishing unit;

Fig. 7 is a cross-section view in elevation taken along the fore and aft center line of the polishing unit; and Fig. 8 is a cross-section view in elevation taken through the middle of the polishing dust removal unit.

Figure 1:
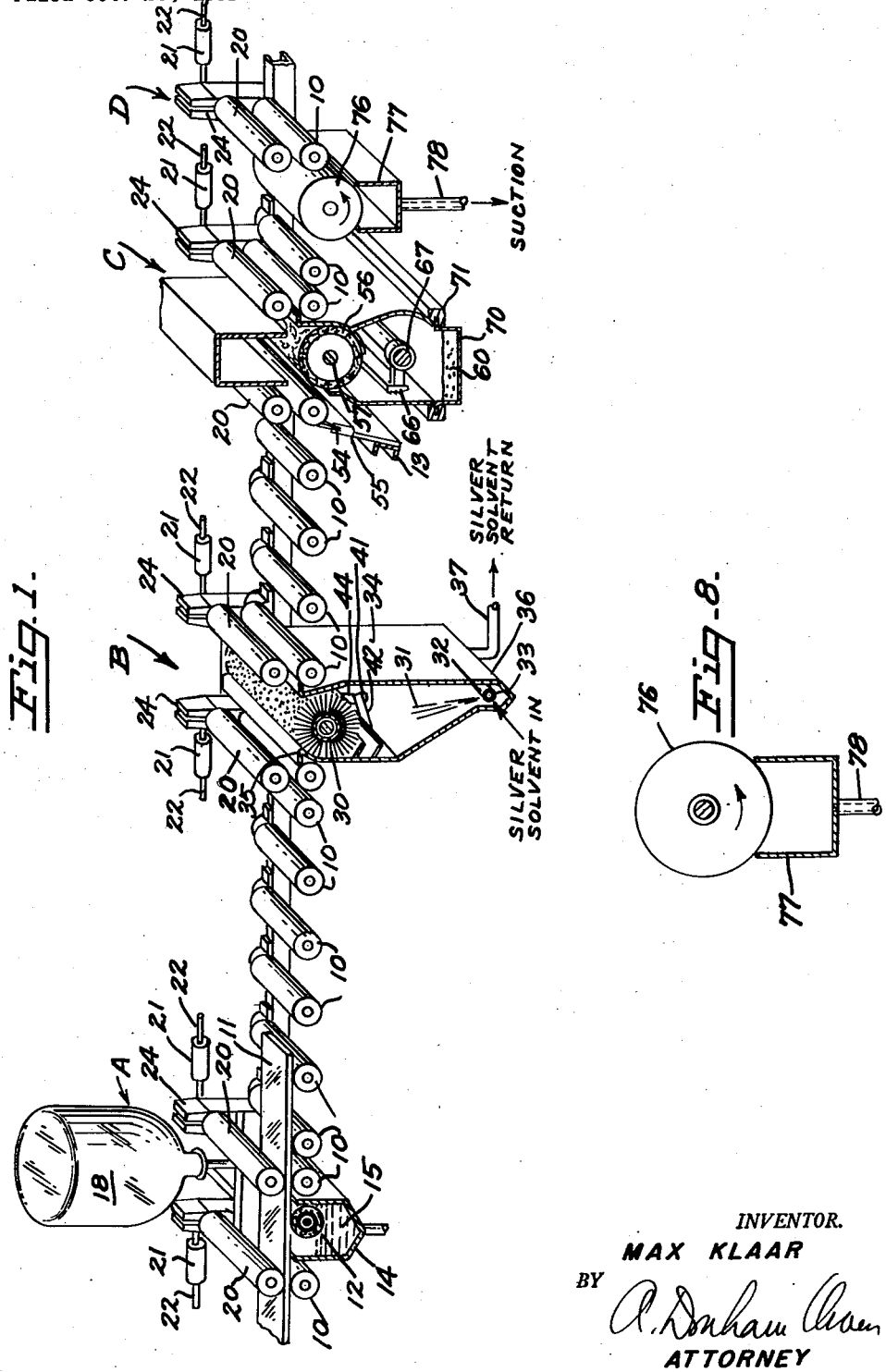
Fig. 1 is an isometric view in cross-section taken along the fore and aft center line of the elements making up the cleaning mechanism.
Figures 2, 3:
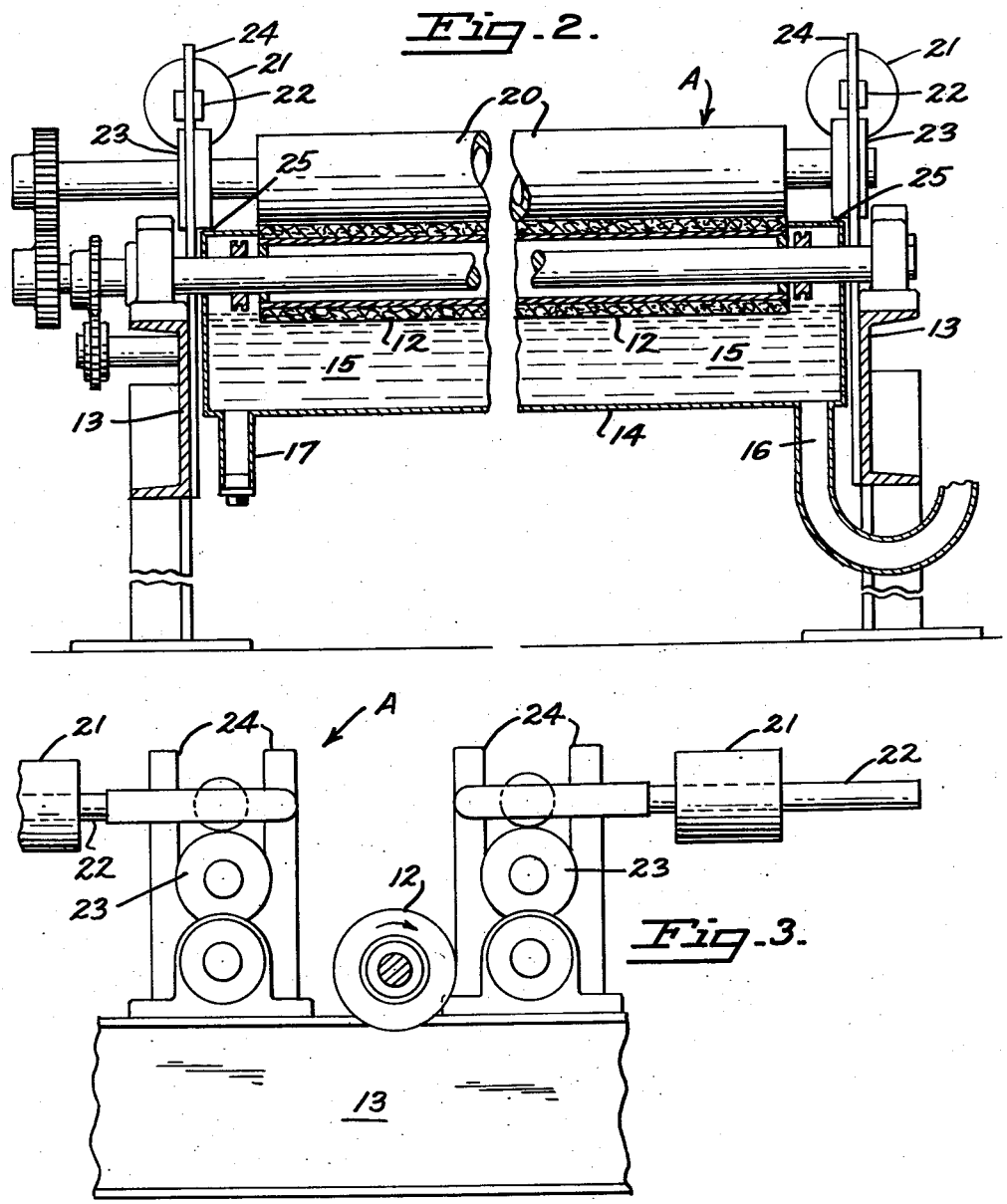
Fig. 2 is a cross-section view in elevation taken through the middle of the paint removal unit.
Fig. 3 is a view in elevation showing the solvent applying roll and the hold down rolls.

These drawings and the following explanation are provided in accordance with the Statute as illustrative of a preferred embodiment of the combination of the invention and not with any idea of limiting the invention to details of construction, as each manufacturer may vary these without departing from the invention.

The present invention is designed to be used with an automatic mirror silvering machine so as to render the whole manufacturing operation free of any manual operation except that of general supervision and inspection. It fits on at the end of the silvering, painting, and drying devices, and is adapted, first, to clean from the downwardly facing unsilvered side of the mirror any accumulation of paint and silver and other foreign matter; and then to polish this side of the glass. It obtains a better and more uniform result than has before been possible. Not only are the mirrors of higher quality, but they are made at a much lower cost for labor.

The cleaning section of the machine is composed of four principal units, the paint dissolver A, the silver dissolver B, the polisher C, and the polish remover D. These units are shown in the sectional, isometric drawing Fig. 1, where 10 denotes the driven rollers forming the conveyor for the glass sheets 11.

*The paint dissolver*

One problem in the paint dissolver unit A is to confine the paint remover solution to the bottom face only of the mirror 11. If it goes over to the back side the paint covering the silver coating is loosened and the mirror is spoiled. The solution is left on the under face of the glass long enough to soften the paint, while the mirror travels on the conveyor 10 from the paint solvent applying roll 12 to the silver solvent unit.

The roll 12 is preferably felt covered and rotates in the same direction of travel of the mirror 11, only slightly faster than the travel of the glass to create a light shearing action. It is journaled in the frame 13 over a tank 14 containing the paint remover solution 15 so its lower portion dips into the solution and carries it up onto the under face of the mirror 11. The solution is fed into the tank 14 through the inlet 16 and can be drained off through the outlet 17. An inverted bottle container 18 is shown as the source of supply, but this may be replaced by any other supply means calculated to keep the level of the solution 15 within desired operating limits. By using a resilient felt roll 12, the solution is controlled and does not spatter up along the edges or over onto the back of the mirror. The carrying rollers 10 are so designed as to provide a minimum amount of contact with the mirror 11 to prevent blotting of the paint solvent.

To hold the mirror 11 in yielding contact with the felt covered applicator roll 12, a pair of pressure applying rollers 20 are mounted to bear on top of the mirror. Adjustable weights 21 on lever arms 22 are provided. The end members 23 slide in the side frames 24 and bear on the trough 14 at 25 when there is no mirror under the rollers 20, so the rollers 20 will not be able to drop down far enough to make contact with the underlying conveyor rollers 10. This is important for otherwise solvents on these rollers 10 would be picked up by the rollers 20 and deposited on the silvered painted top side of the mirrors thus ruining them.

*The silver remover*

This unit B of the machine is shown diagrammatically in Fig. 1 and in more detail in Figs. 4 and 5. The problem here is somewhat analogous to that at the paint removal unit, namely, to avoid getting the softened paint and the silver remover solution onto the silvered top side of the mirror. Also, the softened paint must be brushed off so the silver solvent can get at the silver coating if any is present.

By the time the mirror reaches the silver remover, the paint will have softened and the brush 30 which applies the muriatic acid or other solvent for the silver will brush off any softened paint. Application of the solvent to the uncoated face of the mirror is best effected by a brush 30 rotated as shown by the arrow, so its bristles sweep opposite to the direction the mirror is being moved by the conveyor rolls 10. Application of the solvent 31 to the brush 30 is best effected by spraying it under pressure through the nozzles 32 from a storage source connected to the manifold 33. A spray hood 34 is mounted in the frame 13 and completely envelops all these parts except for the opening 35 which preferably is just large enough for the brush 30 to project through it and into yielding contact with the mirror. The surplus solvent from the spray, as well as the dissolved paint which is brushed from the mirror drops down into the inclined bottom trough 36 from whence it flows through the outlet 37.

Inside the spray hood is a shield 38 covering the collar 40. A scraper bar 41 to remove excess solvent from the brush is mounted on links 42 pivoted to the hood at 43. It is held in correct position against the brush by the screw threaded supports 44 and the threaded nuts 45.

A pair of hold down rolls 20, like those previously described, are provided over the mirror so as to assure sufficient frictional contact of the underside of the mirror with the driven conveyor rolls 10 so the backward force imparted by the brush 30 will not stall the forward movement of the mirror. As in the case of the rolls 20, previously described, the parts are the same and the rolls are prevented from coming into contact with the conveyor rolls 10 because the end members 23 come to rest on the top 46 of the spray hood with still a gap left between the rolls.

Suitable drive mechanism is provided for the brush 30 as well as for all the rotating conveying rolls 10, the felt roller 12, etc. These are well known devices and need no further explanation.

The cleaner and polisher

The problem in the cleaner and polisher is to treat the unsilvered face of the mirror to remove any vestiges of the solvent solutions, paint, or silver.

As the mirror 11 travels over the conveyor roller 10 on entering the cleaner and polisher a brush 54 wipes off any loosened silver deposit which has been picked up by the roller 10 from the mirror. This brush is suitably mounted in the crosspiece 55 attached to the main frame 13.

The cleaner polisher unit C is mounted in the main frame 13. At the top is the felt covered polishing roller 56 positively driven by the shaft 57 and sheaves 58 in a direction opposite to the direction the mirror is traveling. The same arrangement of pressure rolls 20, and weights 21, as already described, is used to hold the mirror down onto the conveyor rolls 10 so it will not be stopped as the friction of the polishing roller 56 acts on it.

The cleaner polisher roller 56 is enclosed in a housing 59 which acts as a reservoir for the polishing powder 60 and as a dust shield. The wall 61 of the housing fits close to the roller 56 and acts to prevent the excess polishing material from falling down into the hopper. This assures that the glass will not receive any sudden blows as would be produced by a hump of material on the roller 56 being brought up against the glass. On the down side of the roller 56 the housing is brought in at 64 fairly close to the wheel to provide a baffle to deflect outside the housing any adhering silver or solvent particles so they do not get into the housing where they might contaminate the polishing material.

The bottom 65 of the housing has a generally rectangular shape and in it is mounted a pick-up or feeder bar 66 suspended from the shaft 67 in arms 68. The bar 66 has a serrated face which tends to retain some of the polishing material on its as it sweeps through the material. The level of the whiting material 60 is kept at about the line 69. As the feeder bar is rotated in the housing by the driven shaft 67 it carries some whiting up into contact with the polishing roller 56 and some of it adheres to the latter. This periodical contact of the roller 56 with the pick-up bar 66 constantly renews the supply of polishing material for the roller.

To introduce more whiting or other polishing powder 60 evenly across the bottom of the housing, the bottom of the housing 59 is provided with a removable pan 70 which slides in the guides 71 secured to the bottom edges of the housing 59. This removable pan 70 provides a means of removing the contaminated cleaning agent and replenishing the supply.

In order to have the glass 11 as clean as possible when it reaches the end of the machine, a second roller 76 must be provided near the roller 56. This roller 76 is mounted in the main frame 13 and has a housing 77 close to its lower portion. A reduced pressure is maintained in the housing 77 so as to draw off from the roller 76 any powder (whiting) it brushes off the polished glass. The outlet 78 is connected to a suitable suction creating device.

Operation

By means of the combination of units described it is possible to build an automatic mirror making machine of outstanding performance. The machine shown is adapted to be secured to the conveyor frame on a mirror silvering and painting machine so that it receives mirrors with their uncoated face down and with the paint dried on their top surface. As shown in Fig. 1, the unsilvered under side of the mirror 11 is being treated in the paint softener unit where the felt roller 12 is depositing a paint solvent. Being a felt roller it does not lap up over the edges or flow the solvent up on the back side of the mirror. While the mirror is passing along the conveyor to the next element, the paint is being softened so that when it passes in over the brush roller 30 the brush sweeps off the loosened paint and deposits a solvent for any silver or silver solution that is on the under side of the glass 11. While the mirror is passing along the conveyor to the next element, the silver or silver solution is being softened so that when the mirror passes over the felt covered polishing roller 56 any silver material will be taken off. The roller 56 is also depositing a measured quantity of whiting on the mirror and polishing it as it does so. The whiting is supplied to the roller 56 by the pick-up feeder bar 66 and the amount of the coating of whiting on the roller 56 is regulated by the r. p. m. of the bar 66. The mirror then passes over the sheep wool covered buffing roller 76 which picks off the whiting from the under face of the mirror and carries it into the suction chamber 77. At this point the mirror is completed and it travels along the conveyor 10 to the unloading table.

While the rollers 30, 56 and 76 are shown as being rotated opposite to the direction of travel of the mirror 11, one or all of these rollers with appropriate changes in their respective housing could be made to do their work if rotated in the same direction of travel as the mirror, but at a different speed than the mirror is traveling.

What is claimed is:

1. In a machine for automatically cleaning and polishing the unsilvered face only of mirrors during their manufacture without damaging the silvered face which includes in combination a frame; a power driven conveyor system on which the mirrors are carried along each with its silver coated side facing upwardly, said conveyor system including a plurality of driven supporting rollers spaced apart on said frame with their axis normal to the path said mirrors travel; a paint solvent applicator means set near one end of said frame and mounted below the top level of said conveyor rollers in between an adjacent pair thereof, said means including a driven applicator roller covered with a yieldable felt and projecting slightly above the level of the tops of said conveyor rollers, and a tank type housing beneath said roller, containing a paint solvent which is absorbed by the cover of said roller; a silver solvent applicator means positioned along said conveyor system a predetermined distance from said paint solvent applicator and mounted below the top level of said conveyor rollers in between an adjacent pair thereof, said means including a driven applicator brush with the tips of its bristles projecting above the level of the tops of said conveyor rollers, a housing surrounding the sides and bottom of said brush, and having a trough below the level of the tops of the conveyor rollers into which the bristles of the brush may impel and shed any loosened paint particles, and means in said housing for applying a silver solvent solution to said brush bristles as they pass therethrough; a mirror cleaning applicator means positioned along said conveyor system a predetermined distance from said silver solvent applicator and mounted below the top level of said conveyor rollers in between an adjacent pair thereof, said means including a driven applicator roller projecting slightly above the level of the tops of said conveyor rollers, a housing enclosing the lower portions of said roller, said housing having a wall closely spaced in relation to the periphery of said roller, means therein for conveying a cleaning compound into contact with said roller adjacent the lower edge of said wall; and a plurality of pressure applying rollers each positioned in said frame above the level of the tops of said conveyor rollers, each pressure roller having means for applying a yielding pressure on the top side of mirrors when passing under it, and means for supporting each pressure roller out of contact with its adjacent conveyor roller when there is no mirror passing under it.

2. The machine of claim 1 in which there is a scraper means secured in said frame to contact the driven conveyor roller located adjacent the entering end of the mirror cleaning applicator means.

3. The machine of claim 1 in which there is a driven buffing roller secured in said frame near the exit end of said machine beyond said mirror cleaning applicator means with its upper surface projecting slightly above the top level of said conveyor rollers.

4. An apparatus for automatically cleaning the downwardly placed uncoated face of a mirror without injury to the upwardly-placed coated face, comprising a frame; a power driven conveying means including a plurality of spaced apart rollers journaled in said frame cross-wise to the line of travel of said mirror; a power driven paint solvent applicator including a roller also journaled in said frame cross-wise to the line of travel of said mirror, between an adjacent pair of said conveyor rollers, and power drive means for rotating said roller at a greater surface speed than the passing mirror; a power driven paint remover and silver solvent applicator means spaced along said conveyor from said paint solvent applicator, including a roller journaled in said frame generally parallel with and between a pair of said conveyor rollers, and power means for rotating the latest-named said roller at a greater peripheral speed than said conveyor rollers, a housing beneath said roller having a mouth through which said roller projects, with one edge of said mouth lowered and in closely spaced contact with said roller whereby any loosened paint particles adhering to said roller will tend to be shed, and means for applying a silver solvent solution to said roller as it rotates into said housing; a power driven polish applicator means spaced along said conveyor from said silver solvent applicator means, including a roller journaled in said frame generally parallel with and between a pair of said conveyor rollers and power means for rotating the latest-mentioned said roller at a greater peripheral speed than said conveyor rollers, a housing beneath said roller having a wall that fits close to said roller to prevent excess polishing material from falling down into the housing, and means in said housing for lifting polishing material therein into contact with said roller; and a plurality of pressure rollers mounted in said frame, above and parallel with each of said driven conveyor rollers which are adjacent each of said applicators whereby said mirror is held on said driven conveyor rollers with a firm pressure.

5. The device of claim 4 including a driven cleaning roller mounted in said frame near said polish applicator means between an adjacent pair of said conveyor rollers, and adapted to brush any residue of polishing materials off said mirror.

6. A method for automatically cleaning the unsilvered surface only of a mirror, directly after the silvering of said mirror, without injury to the delicate silver coating on the silvered side of the mirror, comprising conveying the mirror along a course with its unsilvered face down while performing the following steps successively on said lower, unsilvered surface only: applying a liquid paint solvent; after a time interval brushing off the loosened paint particles while simultaneously applying a silver solvent in liquid form; after a time interval taking off loosened silver particles while simultaneously applying a powdered cleaning compound; and buffing said compound off said mirror.

7. A method for automatically cleaning the unsilvered surface only of mirrors directly after silvering, without injury to the delicate silver coating on the silvered side of the mirrors, comprising: continuously moving the mirrors at a substantially constant speed along a path with the unsilvered face of the mirrors facing down, while performing at spaced-apart stations the following steps successively on said lower, unsilvered surface only: rolling on evenly, without spattering, liquid paint solvent; after a time-space interval brushing off the paint particles loosened by said paint solvent while simultaneously brushing on silver solvent in liquid form; after a time-space interval rubbing off loosened silver particles while simultaneously rolling on a powdered cleaning compound; and buffing said mirror under low-pressure conditions while a suction current draws off the cleaning compound loosened by the buffing.

8. A method for automatically and mechanically cleaning the unsilvered surface only of mirrors directly after silvering, without injury to the delicate silver coating, comprising: passing each mirror, with its unsilvered face down to a series of spaced-apart stations where the following steps are successively performed on said lower, unsilvered surface only: coating it evenly, by direct contact so that there is no spattering, with liquid paint solvent; brushing off the loosened paint particles while simultaneously brushing on liquid silver solvent; rubbing off loosened silver particles while simultaneously rubbing on a smooth even amount of powdered cleaning compound; and buffing said compound off said mirror under a suction current that withdraws the loosened cleaning compound from the vicinity of said mirror and said buffing station.

9. In a machine for automatically cleaning and polishing the unsilvered face only of mirrors during their manufacture, while protecting the silvered face from injury, which includes in combination a frame, a power driven conveyor system on which the mirrors are carried along, each with its silver-coated side facing upwardly, said conveyor system including a plurality of driven supporting lower rollers spaced apart on said frame with their axes normal to the path said mirrors travel; a paint solvent applicator set near one end of said frame and mounted below the top level of said conveyor lower rollers in between an adjacent pair thereof, said applicator including a driven felt-covered roller projecting slightly above the level of the tops of said conveyor lower rollers, a tank beneath said felt-covered roller, containing a paint solvent which is absorbed by the felt of said roller and evenly applied to said mirror, a first pair of upper rollers on each side of said felt-covered roller, vertically above said lower rollers and urged downwardly toward them to urge said mirror into contact with said felt-covered roller, and means to limit their downward travel so that they can never come in contact with said lower rollers, even when no mirror is between said upper and lower rollers; a silver solvent applicator positioned along said conveyor system a predetermined distance from said paint solvent applicator and mounted below the top level of said conveyor lower rollers in between an adjacent pair thereof, said silver solvent applicator including a driven brush with the tips of its bristles projecting above the level of the tops of said conveyor lower rollers, a housing surrounding the sides and bottom of said brush, with a trough below the level of the tops of the conveyor lower rollers into which trough the bristles of the brush may impel and shed any loosened paint particles, a spray nozzle in said housing for spraying a silver solvent solution on said brush bristles as they pass by a predetermined rotational position, a second pair of upper rollers aligned with and directly above the lower rollers on each side of said brush and urged downwardly so that said mirror is urged into contact with said brush, and means for limiting the downward movement of said upper rollers so that they cannot ever contact said lower rollers; a mirror cleaner applicator positioned along said conveyor system a predetermined distance from said silver solvent applicator and mounted below the top level of said conveyor lower rollers in between an adjacent pair thereof, said mirror cleaner applicator including a driven applicator roller projecting slightly above the level of the tops of said conveyor lower rollers, a housing enclosing the lower portions of said roller, said housing having a wall closely spaced in relation to the periphery of said roller, a rotatable feeder bar therein for conveying the cleaning compound into contact with said roller adjacent the lower lip of said wall; a scraper secured in said frame to contact the driven conveyor roller located adjacent the entering end of the mirror polish applicator housing; a pair of pressure applying upper rollers each positioned in said frame above the level of the tops of said conveyor lower rollers, each pressure roller having means for applying a yielding pressure on the top side of mirrors when passing under it, and means for supporting each pressure roller out of contact with its adjacent conveyor lower roller when there is no mirror passing under it; a driven buffing roller secured in said frame near the exit end of said machine beyond said mirror cleaner applicator with its upper surface projecting slightly above the top level of said conveyor lower rollers; a housing surrounding the sides and closing the portion beneath said buffing roller; and suction means in said housing for withdrawing the material buffed off.

10. An apparatus for automatically cleaning the downwardly placed uncoated face of a mirror comprising a frame; a power driven conveying means including a plurality of spaced apart rollers journaled in said frame cross-wise to the line of travel of said mirror; a power driven paint solvent applicator including a roller also journaled in said frame cross-wise to the line of travel of said mirror, between an adjacent pair of said conveyor rollers, and power drive means for rotating said roller at only slightly greater surface speed than the passing mirror and in the same direction; a power driven paint remover and silver solvent applicator means spaced along said conveyor from said paint solvent applicator including a brush journaled in said frame generally parallel with and between a pair of said conveyor rollers, and power drive means for rotating said brush in the opposite direction, a housing beneath said brush having a scraper bar in closely spaced contact with said brush whereby any loosened paint particles adhering to said brush will tend to be shed, and means for applying a silver solvent solution to said brush as it rotates into said housing; a power driven cleaner applicator means spaced along said conveyor from said silver solvent applicator means, including a roller journaled in said frame generally parallel with and between a pair of said conveyor rollers and power drive means for rotating the journaled roller in the opposite direction from them, a housing beneath said roller having a wall that fits close to said roller to prevent excess cleaning material from falling therein, and means in said housing for lifting polishing material therein into contact with said roller; and a driven cleaning roller mounted in said frame near said polish applicator means between an adjacent pair of said conveyor rollers, and adapted to rotate in the opposite direction from said conveying rollers to brush any residue of polishing materials off said mirror.

11. In a machine for automatically cleaning off the unsilvered face only of mirrors during manufacture without damaging the silvered face, the combination of: a frame; a driven conveyor system on which the mirrors are carried along, each with its coated side facing upwardly, said conveyor system including driven supporting rollers spaced apart along the path said mirrors travel; paint solvent applicator means for applying paint solvent to the under face only of said mirrors as they are conveyed along, while protecting the upper side and preventing application of said solvent thereon, said applicator means being positioned below the level of said conveyor system at which said mirrors are conveyed and in between a pair of said spaced apart driven supporting rollers; silver solvent applicator means for applying a silver-dissolving solution to the under face only of said mirrors when said paint solvent has loosened any paint overlying any silver on the under face only of said mirrors and for preventing application of said silver-dissolving solution to the upper face of said mirrors, said silver solvent applicator means being positioned farther along said conveyor system than said paint-solvent applicator means and likewise below the level of said conveyor system at which said mirrors are conveyed and in between a pair of spaced apart driven supporting rollers; mirror-cleaner applicator means for applying a cleaning compound to the under face only of said mirrors after both said paint and said silver residues have been softened and for preventing application of said cleaning compound to the upper face of said mirrors, said mirror-cleaner applicator means being positioned farther along said conveyor system than said silver-solvent applicator means and likewise being below the level of said conveyor system at which said mirrors are conveyed and in between a pair of spaced apart driven supporting rollers; and pressure-applying rollers secured in said frame over each of said driven conveyor rollers which is adjacent said several applicator means, adapted to hold down said mirrors into driving frictional contact with said driven conveyor rollers, whereby any counter force applied to said mirrors by any of said applicator means will not impede the movement of said mirrors along the conveyor system.

12. The device of claim 11 in which said paint-solvent applicator means comprises a roller covered with felt, which applies said solvent smoothly by contact with the unsilvered mirror face, so that there is control over the amount applied and so that spattering along the edges and over onto the upper silvered face is prevented.

13. The device of claim 11 in which said silver-solvent applicator means comprises a brush, enclosed on its lower side in a housing having a trough part way across said housing below the level of the conveyor system and into which the bristles of said brush impel loosened paint particles, said housing also having, below said trough, spray means to impel the silver solvent on said brush through the space in said housing across which said trough does not extend.

14. The device of claim 11 in which said mirror-cleaner applicator means comprises a roller covered with soft, resilient felt and enclosed on its lower side in a housing having a wall closely spaced in relation to the periphery of said roller to regulate the thickness of cleaning material carried to the mirrors on said roller.

15. The device of claim 11 in which said pressure-applying rollers bear on top of the mirror; and in which there are restraining means for preventing the downward movement of said upper rollers beyond the point where, when there is no mirror between rollers, said upper rollers could contact any cleaning material deposited on said lower rollers.

16. In an automatic, continuous, mirror-making machine the combination of a continuous conveyor; means below the top of said conveyor for applying paint solvent to the uncoated side only of each mirror as it is carried along, uncoated side down, on said conveyor, and for preventing application of said paint solvent to the coated side; means below the top of said conveyor for simultaneously brushing off the loosened paint and applying silver solvent to the uncoated side only of the mirror and for preventing its application to the soated side as said mirror is carried further along on said conveyor; and means below the top of said conveyor for removing loosened silver and for cleaning said uncoated side only of the mirror with a powder cleaning compoung as said mirror is carried further along on said conveyor.

17. The machine of claim 16 in which is added means below the top of said conveyor for removing the cleaning compound as the mirror is carried on the conveyor beyond said cleaning means.

References Cited in the file of this patent

UNITED STATES PATENTS

| | | |
|---|---|---|
| 1,289,260 | Powanda | Dec. 31, 1918 |
| 1,817,332 | Worrall | Aug. 4, 1931 |
| 1,953,352 | Kranich | Apr. 3, 1934 |
| 2,272,729 | Searing | Feb. 10, 1942 |
| 2,321,179 | Boyer | June 8, 1943 |
| 2,542,205 | Mort | Feb. 20, 1951 |
| 2,525,166 | Brown | Oct. 10, 1950 |
| 2,525,178 | Miller | Oct. 10, 1950 |
| 2,563,224 | Dunkerly | Aug. 7, 1951 |